United States Patent
Vasudevan et al.

(10) Patent No.: US 9,146,873 B2
(45) Date of Patent: Sep. 29, 2015

(54) ADAPTIVE QUEUING OF A CACHE FOR A PROCESSING ELEMENT

(75) Inventors: Anil Vasudevan, Portland, OR (US); Glenn J. Hinton, Portland, OR (US); Yadong Li, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 51 days.

(21) Appl. No.: 13/436,337

(22) Filed: Mar. 30, 2012

(65) Prior Publication Data

US 2013/0262718 A1    Oct. 3, 2013

(51) Int. Cl.
*G06F 3/00* (2006.01)
*G06F 12/08* (2006.01)
*H04L 12/861* (2013.01)
*G06F 5/10* (2006.01)

(52) U.S. Cl.
CPC .............. *G06F 12/084* (2013.01); *H04L 49/90* (2013.01); *G06F 5/10* (2013.01)

(58) Field of Classification Search
None
See application file for complete search history.

(56) References Cited

U.S. PATENT DOCUMENTS

| | | | |
|---|---|---|---|
| 2002/0194338 A1* | 12/2002 | Elving | 709/226 |
| 2004/0054853 A1* | 3/2004 | Sprangle et al. | 711/137 |
| 2006/0117145 A1* | 6/2006 | Sprangle et al. | 711/137 |
| 2009/0161547 A1* | 6/2009 | Riddle et al. | 370/236 |
| 2010/0106820 A1* | 4/2010 | Gulati et al. | 709/224 |
| 2011/0161590 A1* | 6/2011 | Guthrie et al. | 711/122 |
| 2011/0255403 A1* | 10/2011 | Papirakis | 370/230.1 |
| 2012/0131240 A1* | 5/2012 | Aronovich et al. | 710/53 |

* cited by examiner

*Primary Examiner* — Henry Tsai
*Assistant Examiner* — Aurangzeb Hassan
(74) *Attorney, Agent, or Firm* — Kacvinsky Daisak Bluni PLLC

(57) ABSTRACT

Examples are disclosed for establishing a window for a queue structure maintained in a cache for a processing element for a network device. The processing element may be configured to operate in cooperation with an input/output device such as a network interface card. In some of these examples, the window may include portions of the queue structure having identifiers to active allocated buffers maintained in memory for the network device. The active allocated buffers may be configured to maintain or store data received or to be forwarded by the input/output device. For these examples, the window may be adjusted based on information gathered while the identifiers are read from or written to the portions of the queue structure.

19 Claims, 6 Drawing Sheets

Program Code 400

Variables used:

QueueSize – the default size for the queue
Head – Current pointer for consumer of data from active allocated buffers
Tail – Current pointer for producer of data to active allocated buffers that posted to consumer Algorithm:

Initialization:

Head = prevHead = 0;
    Tail = QueueSize - 1;
    Starting windowSize = producedBuffers = QueueSize;

Runtime event driven processing:

consumedBuffers = (Head – prevHead);
    avalaibleBuffersForConsumer = (Tail – Head);
    // window manager 118 calculates an activeWindowSize that adapts itself based on
    // consumedBuffers and workload properties such as the number of packets per event processing
    activeWindowSize = function (consumedBuffers, #packets per event);
    If (avalaibleBuffersForConsumer >= activeWindowSize) {
        // Consumer has enough buffers, no need to produce more buffers
    }
    Else {
        // Producer provides more buffers to consumer up to activeWindowSize
        Tail += (activeWindowSize – avalaibleBuffersForConsumer);
    }

ADAPTIVE QUEUING OF A CACHE FOR A PROCESSING ELEMENT

BACKGROUND

An input/output (I/O) device may couple to a processing element on a host computing platform or network device such as a networked server. Typically, the I/O device may read information from or cause information to be written to a queue structure maintained in a cache for the processing element. The queue structure may be a circular queue or ring that includes entries or identifiers to a much larger memory for the host network device. The much larger memory may be a type of off-chip memory (as related to the processing element) such as dynamic random access memory (DRAM) or other types of volatile memory. Buffers associated with the identifiers may be maintained at the memory for the host network device. In some examples, these buffers may include data (e.g., payloads from data packets) received or forwarded by the I/O device.

The amount and rate of data received or forwarded by I/O devices (data throughput) has grown rapidly. Additionally, the number of processing elements coupled to a given I/O device has also grown with the deployment of multi-core processors and the use of virtual machines that may be implemented on one or more cores of these multi-core processors. In order to handle increasing data throughput needs as well increasing numbers of processing elements, the number of buffers utilized by I/O devices has also increased rapidly. The use of higher numbers of buffers requires more identifiers and thus the queue structures maintained in caches for processing elements are increasing in size to accommodate more identifiers.

BRIEF DESCRIPTION OF THE DRAWINGS

FIG. 4 illustrates an example program code for adjusting a window.

DETAILED DESCRIPTION

As contemplated in the present disclosure, the use of higher numbers of buffers requires more identifiers and thus larger queue structures to accommodate more identifiers. However, as the size of a queue structure increases, a larger portion of a cache for the processing element may be used. At some point, available cache may be used up by these expanding queue structures and performance of the processing element and/or the I/O device may suffer as a result.

Also, in some examples, a large circular queue may hold identifiers for numerous active allocated buffers. These active allocated buffers will continue to consume power until a consumer of the data (e.g., an I/O device or a processing element) reads the identifier from the queue structure and retrieves the data from the buffer. Typically, the size of a queue structure may be fixed and established upon initialization of an I/O device. So even if the I/O device doesn't need all of the buffers possibly having identifiers in the fixed queue structure, the queue structure may be filled with identifiers. As a result of being filled with identifiers, an unnecessarily large number of buffers may be active and allocated and power to keep these buffers active may be wasted. Also, the allocated buffers could possibly be utilized by other processing elements and/or applications on a host network device and thus valuable memory resources may be underutilized or wasted.

In some examples, techniques are implemented for adjusting a window including portions of a queue structure maintained in a cache for a processing element. For these examples, a window may be established for a queue structure of a given size maintained in a cache for a processing element. The processing element may be configured to operate in cooperation with an I/O device for a network device. The window may include portions of the queue structure having identifiers for active allocated buffers maintained in memory for the network device (e.g., DRAM). The active allocated buffers may be configured to at least temporarily maintain data (e.g., associated with data frames or data packets) received or to be forwarded by the input/output device. Also, for these examples, the window may be adjusted based on information gathered while the identifiers are read from or written to the portions of the queue structure.

Figure 1:
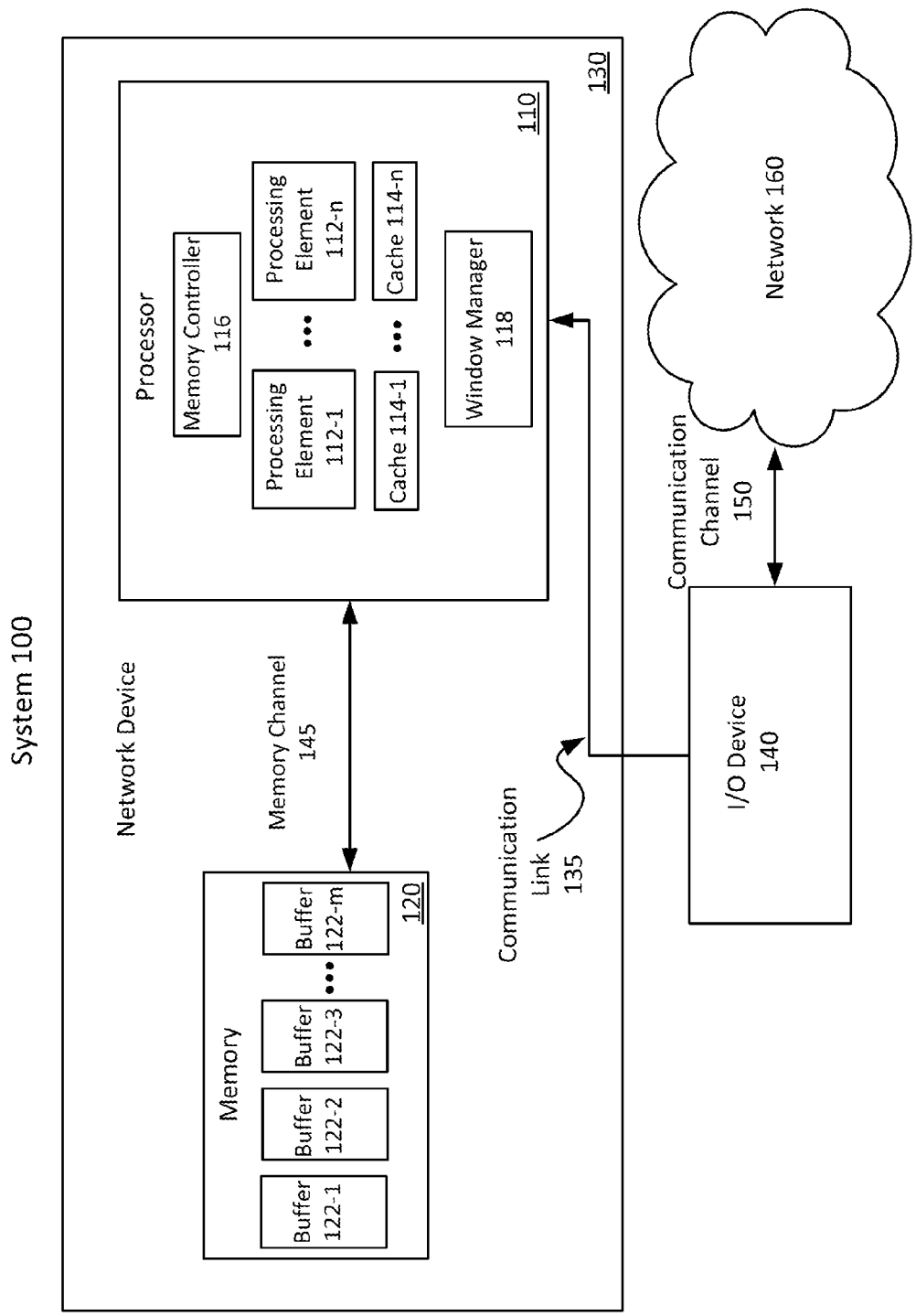
FIG. 1 illustrates an example system.

FIG. 1 illustrates a diagram of an example system 100. In some examples, as shown in FIG. 1, system 100 may include a processor 110, a memory 120, an I/O device 140 and a network 160. Also, as shown in FIG. 1, processor 110 and I/O device 140 may be communicatively coupled via a communication link 135 and I/O device 140 may also be communicatively coupled to network(s) 160 via a communication channel 150. Also processor 110 may couple to memory 120 via memory channel 145. As shown in FIG. 1, according to some examples, processor 110 and memory 120 may be included on or resident on a network device 130.

In some examples, as shown in FIG. 1, processor 110 may include processing elements 112-1 to 112-n (where "n" represents any whole integer>1). Also, as shown in FIG. 1, memory 120 may include buffers 122-1 to 122-m (where "m" represents any whole integer>3). For these examples, processing elements 112-1 to 112-n may have a corresponding cache 114-1 to 114-n. Although corresponding caches are shown in FIG. 1 for processing elements 112-1 to 112-n, this disclosure contemplates one or more shared caches between processing elements 112-1 to 112-n.

As described more below, a cache for a given processing element may include a queue structure of a given size configured or arranged to maintain buffer memory addresses or identifiers (e.g., to buffers 122-1 to 122-m). Also, as described more below, a memory controller 116 may interface with memory 120 (e.g., via communication link 135) to enable processing elements 112-1 to 112-n to access data stored in memory 120 (e.g., in buffers 122-1 to 122-m).

According to some examples, network device 130 may be part of a computing device deployed in a server environment. For these examples, I/O device 140 may be a network interface card (NIC) configured to receive, send or forward data for network device 130. For example, I/O device 140 may receive or forward data such as data frames or data packets via communication channel 150 from network(s) 160. Data to be received or forwarded, for example, may be at least temporarily stored in memory 120 (e.g., in buffers 122-1 to 122-m).

In some examples, as shown in FIG. 1, processor 110 may also include a window manager 118. As described more below, window manager 118 may include logic and/or features configured to adjust a window for a queue structure maintained at a cache for a processing element (e.g., processing element 112-1) on network device 130. The window, for example, may include portions of the queue structure having identifiers to active allocated buffers (e.g., selected from buffers 122-1 to 122-m) maintained in memory 120. For these examples, the logic and/or features of window manager 118 may adjust the window based on information gathered while the identifiers are read from or written to the portions of the queue structure included in the window.

According to some examples, processor 110 may be a multi-core processor and processing elements 112-1 to 112-n may be cores for the multi-core processor. In other examples, processing elements 112-2 to 112-n may include one or more virtual machines. For these other examples, the virtual machines may be implemented on a single processor included in processor 110. Alternatively, the virtual machines may be implemented on a core or cores of a multi-core processor included in processor 110.

According to some examples, as shown in FIG. 1, communication link 135 may include a data bus and may communicatively couple or interconnect processor 110 and I/O device 140. For these examples, communication link 135 may be operated in accordance with various communication protocols or standards. These communication protocols or standards may be described in one or more industry standards (including progenies and variants) to include, but not limited to the Peripheral Component Interconnect Express (PCI Express) specification.

In some examples, as shown in FIG. 1, memory channel 145 may couple memory 120 to processor 110. For these examples memory channel 145 may operate in compliance with one or more memory standards or specifications such as specifications by the JEDEC Solid State Technology Association. The specifications (including progenies and variants) by the JEDEC Solid State Technology Association may include, but are not limited to, the double data rate type-three (DDR3) synchronous dynamic random access memory (SDRAM) specification, published in June 2007 ("the DDR3 specification").

In some examples, communication channel 150 may include one or more communication links via which I/O device 140 may couple to network 160. These communication links may include various types of wired, wireless or optical communication mediums. For these examples, the communication links may be operated in accordance with one or more applicable communication or networking standards in any version.

Figure 2:
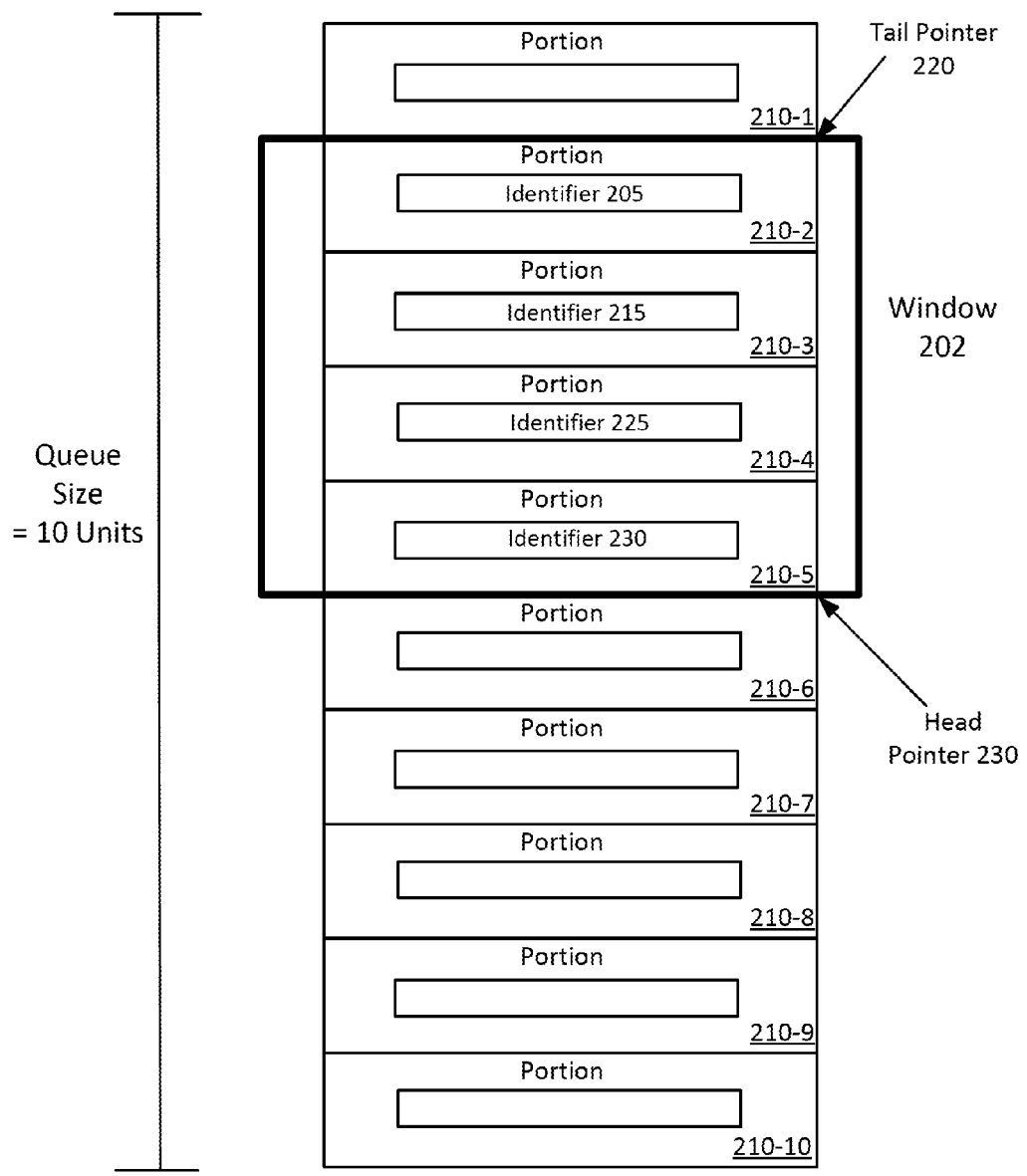
FIG. 2 illustrates a block diagram of an example queue structure.

FIG. 2 illustrates a block diagram of an example queue structure 200. According to some examples, queue structure 200 may be maintained at least in part in a cache for a processing element (e.g., cache 114-1). As shown in FIG. 2, queue structure 200 includes portions 210-1 to 210-10. In some examples, each portion of queue structure 200 may be separately associated with a single unit of size. Thus for the example queue structure 200 shown in FIG. 2, portions 210-1 to 210-10 would equate to a cumulative total queue structure size of 10 units as depicted to the left of queue structure 200. Although this disclosure is not limited to a queue structure having a size of 10 units, any number of units or portions may be included in a queue structure.

According to some examples, as shown in FIG. 2, queue structure 200 may also include a window 202. For these examples, window 202 may include portions 210-2- to 210-5 having identifiers 205, 215, 225 or 230. Identifiers 205, 215, 225 or 230 may separately represent identifiers (e.g., physical memory addresses) for active allocated buffers maintained in a memory (e.g., memory 120).

As shown in FIG. 2, window 202 also includes a tail pointer 220 and a head pointer 230. Tail pointer 220 may indicate the next portion of queue structure 200 to be written to (e.g., portion 210-2). Head pointer 230 may indicate the next portion of queue structure 200 to be read from (e.g., potion 210-5).

According to some examples, identifiers may be read from or written to queue structure 200 based on a type of stack scheme. One type of stack scheme may include writing identifiers or causing identifiers to be written to portions of queue structure 200 and then reading the identifiers based on a first-in-first-out (FIFO) scheme. For these examples, tail pointer 220 may point to portion 210-2. Portion 210-2 may be the oldest portion of queue structure 200 within window 202 that was read from. Also, head pointer 230 may point to the oldest portion of queue structure 200 within window 202 that was written to. As a result, after portion 210-5 is read from, tail pointer 220 moves down the stack to the next oldest portion of queue structure 200 (e.g., portion 210-3) that was read from. Also, after portion 210-5 is written to, head pointer 230 moves to the top of the stack and portion 210-2 becomes the next portion to be read from.

According to some other examples, identifiers may be read from or written to queue structure 200 based on another type of stack scheme. The other type of stack scheme may include writing identifiers or causing identifiers to be written to portions of queue structure 200 and then reading the identifiers based on a last-in-first-out (LIFO) scheme. For these other examples, tail pointer 220 may point to the most recent portion of queue structure 200 within window 202 that was read from. Also head pointer 230 may point to the most recent portion of queue structure 200 within queue structure 202 that was written to. As a result, after portion 210-5 is read from, tail pointer 220 moves down the stack and 210-5 becomes the next portion to be written to. Also, head pointer 230 moves to the top of the stack and portion 210-2 becomes the next portion to be read from.

In some examples, window 202 may be a sliding window that slides or moves down queue structure 200 but maintains the same number of portions. For example, once identifier 205 is read from portion 210-2, window 202 moves or shifts down and now includes a new window having portions 210-3 to 210-6. Identifier 205 is then written to portion 210-6 and head pointer 230 may now point to portion 210-6 (if LIFO scheme implemented). Tail pointer 220 may now point to portion 210-5. Also, for this example, portion 210-2 becomes unselected and may not include an identifier to an active allocated buffer. So even though window 202 has been adjusted to result in a new window, the new window includes some different portions of queue structure 200. The size of the new window is the same as window 202 but now includes identifiers 205 to 230 that were previously included in window 202.

In some examples, the portions of queue structure 200 included in window 202 may be selected based on those portions including cache warmed identifiers for active allocated buffers compared to unselected portions of queue structure 200. In other words, portions 210-2 to 210-5 already include identifiers 205, 215, 225 and 230 to active allocated buffers. Thus, since these identifiers are already written to portions of queue structure 200 they are included in the cache hierarchy and may be considered as cache warmed. Thus when window 202 is established, the window may include portions of queue structure 200 already having identifiers for active allocated buffers. Also, implementation of types of stack schemes that include writing identifiers to portions of queue structure 200 and then reading the identifiers based on FIFO or LIFO schemes increases the likelihood that the selected portions of queue structure 200 include cache warmed identifiers. For example, as shown in FIG. 2, the top of window 202 is at portion 210-2. If a FIFO is scheme is implemented, then portion 210-3 will be the next portion read from queue structure 200. Further, after portion 210-5 is eventually read, the next portion to be read would be the top of window 202, which is portion 210-2.

According to some examples, a producer or a consumer of data maintained in the buffers of memory 120 may be based on the perspective of data that is received or data that is forwarded. For example, if data is received, I/O device 140 receives the data and serves as the producer of data that is placed in the buffers of memory 120. The consumer of the data would be the processing elements of processor 110. If data is forwarded, the processing elements of processor 110 serve as the producer of data that is placed in the buffers of memory 120 and I/O device 140 now becomes the consumer of the data.

In some examples, when I/O device 140 serves as a producer (data received), I/O device 140 may be configured to cause identifiers to be written to queue structure 200. For these examples, the identifiers may remain in queue structure 200 even after being read by the consumer. Even though the identifiers were written to queue structure 200 by an I/O device, the identifiers may not be subject to eviction from queue structure 200. Thus, identifiers for active allocated buffers may remain in queue structure 200 and can be reused again rather than allocating more or different buffers. As a result of being able to reuse the same active allocated buffers, only the four portions or queue structure 200 included in window 202 may be needed.

According to some examples, when a processing element serves as a producer (data to be forwarded), the processing element may write identifiers to queue structure 200. For these examples, I/O device 140 may be configured to read the identifiers directly from queue structure 200 to determine which buffers in memory 120 include the data produced by the processing element. Even though the identifiers were read to queue structure 200 by an I/O device, the identifiers may not be subject to eviction from queue structure 200. Thus, as mentioned above, identifiers for active allocated buffers may remain in queue structure 200 and can be reused again rather than having to write new or different identifiers to new or different active allocated buffers.

According to some examples, the size of queue structure 200 may be determined during initialization of I/O device 140. For these examples, I/O device 140 may base the size of queue structure 200 on various operating characteristics when coupled to network device 130. For example, the number of buffers in memory 120 that may be needed to maintain a given data throughput. The more buffers needed, the larger the size of queue structure 200. The given data throughput may be based on maintaining a line rate for data received at or forwarded from I/O device 140. In some examples, if the processing elements of processor 110 are substantially faster at handling data received or forwarded by I/O device 140, then the size of queue structure 200 may need to be large in order to accommodate more identifiers to buffers. Conversely, if I/O device 140 can handle data faster or at least approximately equal to the processing elements, then the size of queue structure may need to be relatively small. The size of the queue structure may also be influenced by quality of service (QoS) requirements (e.g., traffic classes or other types of data classification).

In some examples, although the size of queue structure 200 may have been established during initialization of I/O device 140, not all of the portions of queue structure 200 may be needed based on actual operating conditions. For example, the actual operating conditions may result in data received and forwarded by I/O device 140 being less than or at a lower rate than anticipated when the size of queue structure 200 was established. Thus, only a fraction of anticipated active allocated buffers may be needed to maintain a given throughput such as a line rate throughput.

According to some examples, as shown in FIG. 2, window 202 may be established to include only four of the ten possible portions of queue structure 200. For these examples, the actual operating conditions may indicate that window 202 need only include the four portions of queue structure 200 for I/O device 140 to maintain a line rate throughput and/or meet QoS requirements associated with a given throughput that may be less than a line rate throughput.

In some examples, as described more below, window manager 118 may include logic and/or features configured to adjust window 202. For these examples, adjustments to window 202 may be based on information gathered while identifiers 205, 215, 225 or 230 are read from and written to portions 210-2 to 210-5 of queue structure 200. Window manager 118 may determine to adjust window 202 to form a new window that may have fewer or more portions having identifiers to buffers maintained at memory 120.

Figure 3:
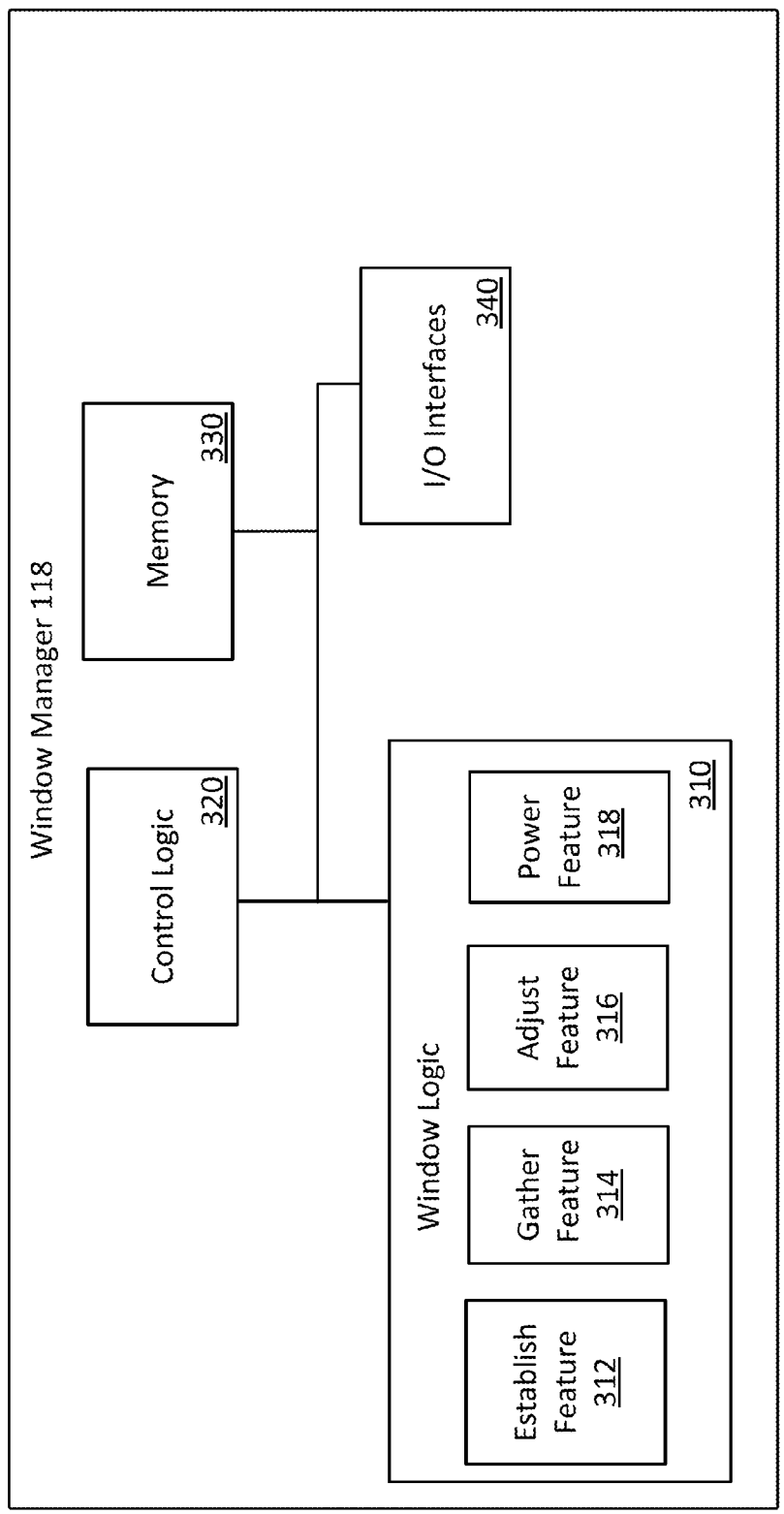
FIG. 3 illustrates a block diagram of an example architecture for a window manager.

FIG. 3 illustrates a block diagram of an example architecture for window manager 118. In some examples, window manager 118 includes features and/or logic configured or arranged for adjusting a window including portions of a queue structure maintained at least in part in a cache for a processing element. According to some examples, as shown in FIG. 3, window manager 118 includes a window logic 310, a control logic 320, a memory 330 and input/output (I/O) interfaces 340. As illustrated in FIG. 3, window logic 310 may be coupled to control logic 320, memory 330 and I/O interfaces 340. Window logic 310 may include one or more of an establish feature 312, a gather feature 314, an adjust feature 316 or a power feature 318, or any reasonable combination thereof.

In some examples, the elements portrayed in FIG. 3 are configured to support or enable window manager 118 as described in this disclosure. A given window manager 118 may include some, all or more elements than those depicted in FIG. 3. For example, window logic 310 and control logic 320 may separately or collectively represent a wide variety of logic device(s) or executable content to implement the features of window manager 118. Example logic devices may include one or more of a microprocessor, a microcontroller, a processor circuit, a field programmable gate array (FPGA), an application specific integrated circuit (ASIC), a sequestered thread or a core of a multi-core/multi-threaded microprocessor or a combination thereof.

In some examples, as shown in FIG. 3, window logic 310 includes establish feature 312, gather feature 314, adjust feature 316 or power feature 318. Window logic 310 may be configured to use one or more of these features to perform operations. For example, establish feature 312 may establish a window including portions of a queue structure maintain in a cache for a processing element. The portions of the queue structure having identifiers associated with active allocated buffers maintain in a memory. Gather feature 314 may gather information while the identifiers are read from or written to the queue structure. Adjust feature 316 may use the gathered information to determine whether to adjust a size of the window or to maintain the size of the window. Power feature 18 may determine whether an I/O device and/or a network device coupled to the I/O device has powered down.

In some examples, control logic 320 may be configured to control the overall operation of window manager 118. As mentioned above, control logic 320 may represent any of a wide variety of logic device(s) or executable content. For some examples, control logic 320 may be configured to operate in conjunction with executable content or instructions to implement the control of window manager 118. In some alternate examples, the features and functionality of control logic 320 may be implemented within window logic 310.

According to some examples, memory 330 may be arranged to store executable content or instructions for use by control logic 320 and/or window logic 310. The executable content or instructions may be used to implement or activate features, elements or logic of window manager 118. As described more below, memory 330 may also be arranged to at least temporarily maintain information associated with adjusting a window for a queue structure maintained in a cache for a processing element. Memory 330 may also be arranged to at least temporarily maintain information gathered while identifiers to buffers are read from or written to portions of the queue structure included in the window.

Memory 330 may include a wide variety of non-volatile memory media including, but not limited to, one or more types of flash memory, programmable variables or states read-only memory (ROM), random access memory (RAM), or other static or dynamic storage media.

In some examples, I/O interfaces 340 may provide an interface via a local communication medium or link between window manager 118 and elements of I/O device 140 or elements of network device 130 depicted in FIG. 1 (e.g., memory 120 or other elements of processor 110). I/O interfaces 340 may include interfaces that operate according to various communication protocols or standards to communicate over the local communication medium or link. These communication protocols or standards may be described in one or more industry standards (including progenies and variants) such as those associated with Intel® QuickPath Interconnect (QPI), Inter-Integrated Circuit (I$^2$C) specification, the System Management Bus (SMBus) specification, the Peripheral Component Interconnect Express (PCI Express) specification, the Universal Serial Bus (USB), specification or the Serial Advanced Technology Attachment (SATA) specification. Although this disclosure is not limited to only the above-mentioned standards and associated protocols.

FIG. 4 illustrates example program code 400 for adjusting a window. In some examples, window manager 118 may include logic and/or features configured to implement at least portions of program code 400 to adjust window 202. According to some examples, as shown in FIG. 4, the variables of program code 400 may include QueueSize, Head and Tail. For these examples, queue structure 200 shown in FIG. 2 may be used to describe how these variables may relate to a queue structure maintained in a cache for a processing element and how inputs for program code 400 may be gathered while identifiers are read from or written to the portions of queue structure 200.

In some examples, queue structure 200 shown in FIG. 2 has a QueueSize of 10 units, a Head that equates to portion 210-10 or unit 10 and a Tail that equates to portion 210-1 or unit 1. Also window 202 has a Starting windowSize of 10 units. For these examples, since portions 210-1 to 210-10 may all initially include identifiers, and thus producedBuffers initially equates to 10 and thus the QueueSize equates to 10 units at initialization of program code 400.

According to some examples, at Runtime event driven processing, consumedBuffers may be determined by comparing the current head pointer 230 to the previous head pointer. So now if the previous head pointer was at unit 4 and, as shown in FIG. 2, the current head pointer 230 is at unit 5, the consumedBuffers would equate to 1. Also availableBuffersForConsumer may be determined by calculating the spread in units between tail pointer 220 and head pointer 230. As shown in FIG. 2 that difference is 4 units.

In some examples, window manager 118 may include logic and/or features to determine an activeWindowSize (e.g., window 202) based on a function of consumedBuffers determined as mentioned above and workload properties such as the number of packets historically processed during each event that may result in identifiers being written to and/or read from queue structure 200 (e.g., based on throughputs). For these examples, if availableBuffersForConsumer≥activeWindowSize then the consumer has enough allocated buffers and window 202 does not need to be expanded. For example, if the number of packets historically processed typically results in the consumption of 4 or less identifiers, then window 202 does not need to be expanded. Otherwise, if more than 4 identifiers are being used by the consumer, window 202 may need to be expanded. For example, if activeWindowSize indicates at least 5 identifiers from queue structure 200 are being used by consumers, then the difference between tail pointer 220 and head pointer 230 needs to be expanded by at least 1 unit.

Figure 5:
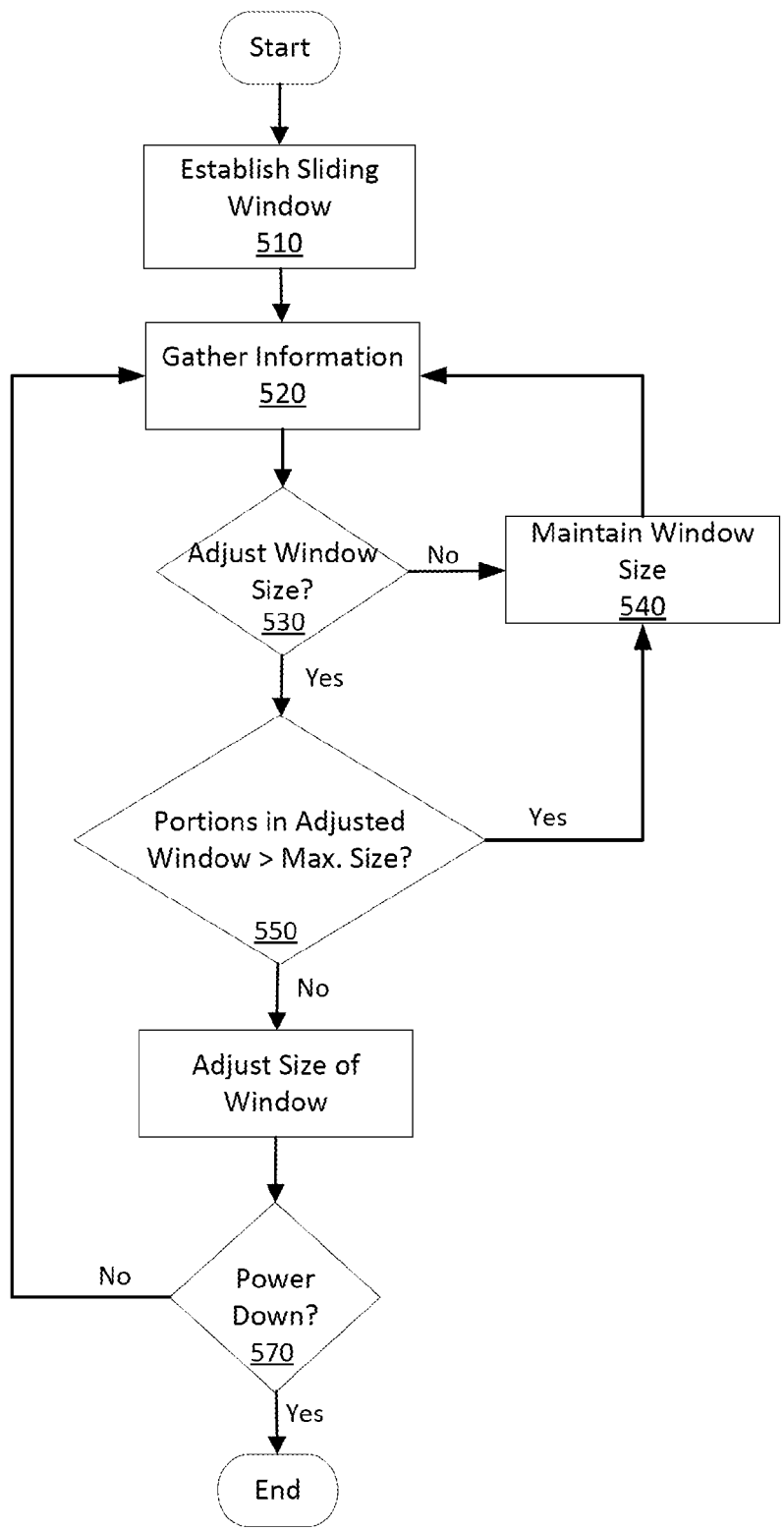
FIG. 5 illustrates an example flow diagram for adjusting a window.

FIG. 5 illustrates an example flow diagram for adjusting a window. In some examples, elements of system 100 as shown in FIG. 1 may be used to illustrate example operations related to the flow chart depicted in FIG. 5. Window manager 118 as shown in FIG. 1 and FIG. 3 and queue structure 200 shown in FIG. 2 may also be used to illustrate the example operations. But the described example operations are not limited to implementations on system 100, window manager 118 or to queue structure 200. Also, logic and/or features of window manager 118 may implement at least portions of program code 400 as shown in FIG. 4. The example operations may also be implemented using other program codes to determine how to adjust a window.

Moving from the start to block 510 (Establish Window), window manager 118 may include logic and/or features configured to establish window 202 (e.g., via establish feature 312). In some examples, window 202 may include portions 210-2 to 210-5. For these examples, window manager 118 may have selected these portions of queue structure 200 based on portions 210-2 to 210-5 already having identifiers for active allocated buffers and thus being cache warmed compared to unselected portions of queue structure 200. Also, for these examples, use of a stack scheme for reading/writing identifiers to queue structure 200 may also increase the likelihood that portions 210-2 to 210-5 are cache warmed. For example, as mentioned previously, use of the stack scheme may include writing identifiers to portions of a queue structure and then reading the identifiers for the portions based on a LIFO or FIFO scheme.

Proceeding from block 510 to block 520 (Gather Information), window manager 118 may include logic and/or features configured to gather information while identifiers 205 to 230 are read from and written to portions 210-2 to 210-5 (e.g., via gather feature 314). In some examples, the information gathered may indicate whether consumers of data are consuming the data placed in the active allocated buffers associated with identifiers 205 to 230 faster or slower than producers can place the data in these active allocated buffers. For example, if I/O device 140 is the producer and processing element 112-1 is a consumer, then window manager 118 may gather information such as whether processing element 112-1 attempted to obtain data from an identifier included in portions 210-2 to 210-5 but I/O device 140 had yet to place data in the active allocated buffer associated with that identifier.

Other information gathered for this example may include information reflecting an opposite scenario. For this opposite scenarios, I/O device 140 may have placed data in one or more active allocated buffers associated with identifiers included in one or more portions 210-2 to 210-5 and processing element 112-1 has not attempted to obtain data from the one or more active allocated buffers for an extended period of time (e.g., based on a given time threshold). Also, QoS information may also be gathered that may indicate whether a predetermined throughput has been obtained for one or more traffic classes or other types of data classifications that may be used to receive/forward data via communication channel 150.

Proceeding from decision block 520 to decision block 530 (Adjust Window Size?), window manager 118 may include logic and/or features configured to determine whether to adjust the size of window 202 (e.g., via adjust feature 316). In some examples, program code 400 may be implemented to determine whether to adjust the size of window 202. For these examples, the inputs for the program code 400 may include the information gathered while identifiers 205 to 230 are read from or written to portions 210-2 to 210-5. According to some examples, an output of the implementation of program code 400 may indicate whether more or less active allocated buffers are need in order to maintain a line rate throughput to receive/forward data via communication channel 150 or to maintain a predetermined throughput to receive and/or forward the data (e.g., based on QoS requirements) via communication channel 150. If more or less active allocated buffers are indicated as being needed, the process moves to decision block 550. Otherwise, the process moves to block 540.

Moving from decision block 530 to block 540 (Maintain Window Size), window manager 118 may maintain window 202 to include portions 210-2 to 210-5. Alternatively, window 202 may be slid or incremented to include different portions and thus be adjusted to form another window, but the other window still maintains the same window size as window 202. In some examples, the process may then move back to block 520 to gather more information.

Moving from decision block 530 to decision block 550 (Portions in Adjusted Window>Max. Size?), window manager 118 may include logic and/or features configured to determine whether adjusting window 202 results in another window that would exceed a maximum size (e.g., via adjust feature 316). The maximum size may be based on the cumulative size of all the portions of queue structure 200. Since queue structure 200 has a queue size of 10, the maximum size would be 10. According to some examples, window 202 may be adjusted to result in the other window as long as no more than 6 portions are added. If the maximum size for the adjustment would not be exceeded, the process moves to block 560. Otherwise, if the maximum size would be exceeded, the process moves to block 540.

Moving from decision block 550 to block 560 (Adjust Size of Window), window manager 118 may include logic and/or features configured to adjust window 202 (e.g., via adjust feature 316). In some examples, window manager 118 may adjust or expand window 202 by adding one or more portions. For these one or more additional portions, respective identifiers associated with additional active allocated buffer(s) may be added. In other examples, window manager 118 may adjust or contract window 202 by subtracting one or more portions. For the portions removed from queue structure 200, one or more identifiers associated with active allocated buffer(s) are erased or removed. The portion of memory 120 used to maintain these buffers may then be freed up for other uses or may be lowered to less power consuming states.

Moving from block 560 to decision block 570 (Power Down?), window manager 118 may include logic and/or features configured to determine whether I/O device 140 and/or network device 130 has powered down (e.g., via power feature 318). Powered down, for example, includes shutting off or removing the power to network device 130 and/or I/O device 140. If I/O device 140 and/or network device 130 has powered down, the process comes to an end. Otherwise, the process moves back to block 520.

Figure 6:
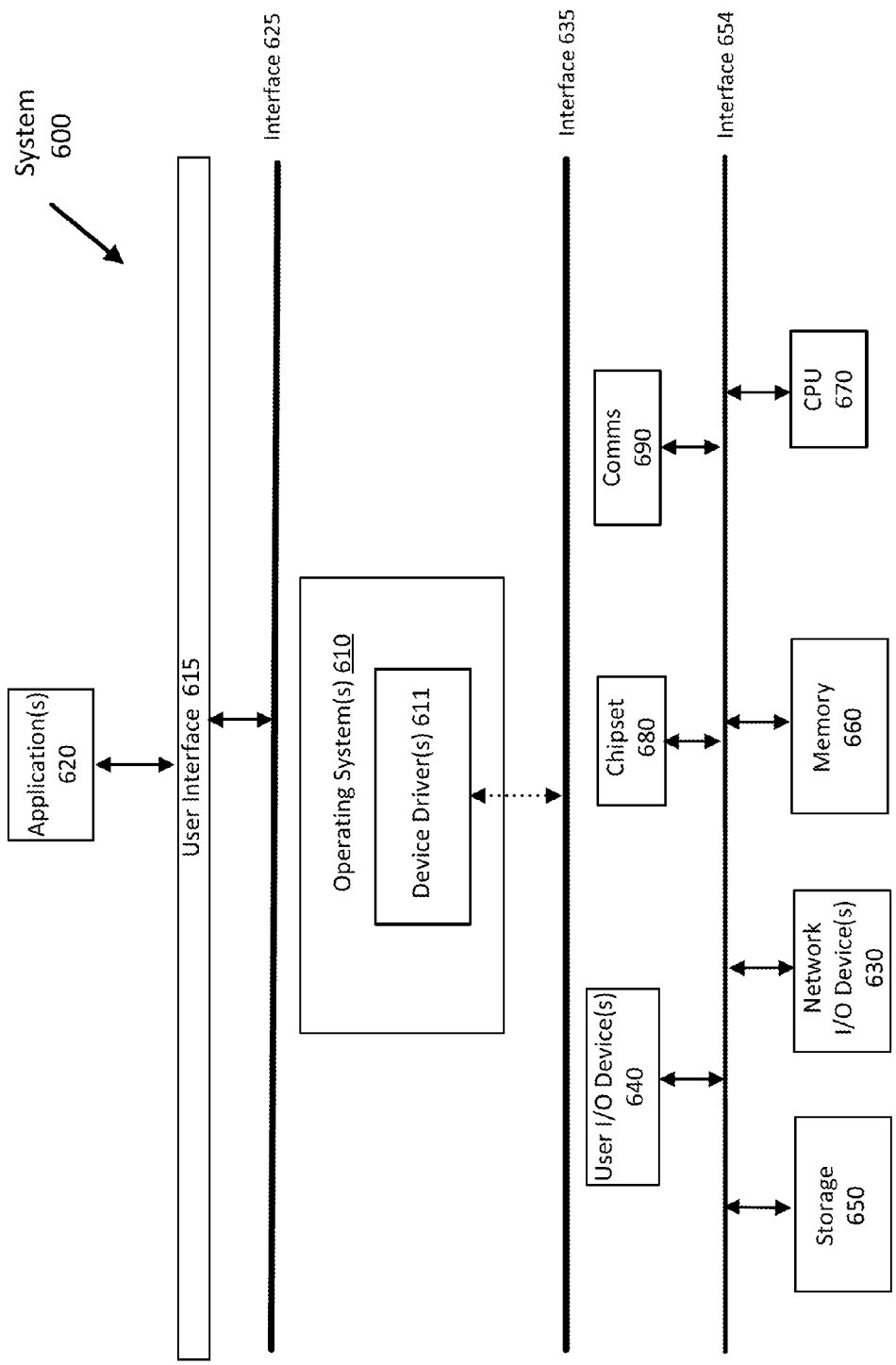
FIG. 6 illustrates an example system.

FIG. 6 illustrates an example system 600. As shown in FIG. 6, system 600 includes operating system(s) 610, application(s) 620, network input/output (I/O) device(s) 630, user input/output (I/O) device(s) 640, a storage 650, a memory 660, a central processing unit (CPU) 670, a chipset 680, and communications (Comms) 690. According to some examples, several interfaces are also depicted in FIG. 6 for interconnecting and/or communicatively coupling elements of system 600. For example, user interface 615 and interface 635 may allow for users (not shown) and/or application(s) 620 to couple to operating system(s) 610. Also, interface 635 may allow for elements of operating system(s) 610 (e.g., device driver(s) 611) to communicatively couple to elements of system 600 such as network I/O device(s) 630, user I/O device(s) 640, storage 650, memory 660, CPU 670, chipset 680 or comms 690. Interface 654, for example, may allow hardware and/or firmware elements of system 600 to communicatively couple together, e.g., via a system bus or other type of internal communication channel.

In some examples, as shown in FIG. 6, system 100 may include operating system(s) 610. Operating system(s) 610, for example, may include one or more operating systems. Separate operating systems included in operating systems(s) 610 may be implemented as part of separate virtual machines supported by elements of system 600. For these examples, the separate virtual machines may be associated with one or more processors included in CPU 670.

According to some examples, as shown in FIG. 6, operating system(s) 610 may include device driver(s) 611. Device driver(s) 611 may include logic and/or features configured to interact with hardware/firmware type elements of system 600 (e.g., via interface 635). For example, device driver(s) 611 may include device drivers to control or direct storage 650 or memory 660 to fulfill requests made by application(s) 620 or operating system(s) 610. Device driver(s) 611 may also include device drivers to allow network I/O device(s) 630 to interact with CPU 670 and memory 660 to receive/forward data via communication channels coupled to system 600 (e.g., via network I/O device(s) 630 or comm 690).

In some examples, application(s) 620 may include applications that may be implemented on system 600. For these examples, applications(s) 620 may request access (e.g., through operating system(s) 610) or use of elements of system such as network I/O device(s) 630, user I/O device(s) 640, storage 650 or memory 660.

According to some examples, network I/O device(s) 630 may be similar to I/O device 140 described above for FIG. 1. In some examples, network I/O device(s) 630 may be arranged to function as a network interface card (NIC).

In some examples, user I/O device(s) 640 may include one or more user input devices coupled to interface 654 for entering data and commands to be implemented by elements of system 600. For example, the user input devices may include a keyboard, mouse, touch screen, track pad, track ball, isopoint, a voice recognition system, and/or the like. Similarly, user I/O device(s) 640 may include one or more user output devices coupled to interface 654 for outputting information to an operator or user. For example, the user output devices may include one or more displays, printers, speakers, and/or other output devices, if desired. For example, one of the user output devices may be a display. The display may be a cathode ray tube (CRTs), liquid crystal displays (LCDs), or any other type of display.

In some examples, storage 650 may include various types of memory configured to be implemented or operated in a storage mode of operation. Storage 650 may include at least one or a combination of different types of storage devices to store relatively large amounts of data. These different types of storage devices may include, but are not limited to, one or more of a magnetic disk drive, an optical disk drive, a tape drive, an internal storage device, an attached storage device, flash memory, battery backed-up SDRAM (synchronous DRAM), a network accessible storage device, and/or other types of non-volatile memory (e.g., phase change material (PCM)). Although not shown in FIG. 6, in some examples, storage 650 may be a user I/O device included among I/O device(s) 140.

According to some examples, memory 660 may include at least one or a combination of different types of memory to include random access memory (RAM), dynamic random access memory (DRAM), static RAM (SRAM), phase change material RAM (PRAM), and/or other types of volatile memory. In some examples, memory 660 may be configured to maintain buffers used by consumers and producers of data received at or forwarded from system 600. For these examples, memory 660 may function similarly to memory 120 as described above for system 100.

According to some examples, CPU 670 may be implemented as a central processing unit for system 600. CPU 670 may include one or more processors separately having one or more processor cores. In some examples, CPU 670 may include one or more processors similar to processor 110 described above for system 100. Also, the processors included in CPU 670 may be any type of processor, such as, for example, a multi-core processor, a reduced instruction set computer (RISC), a processor having a pipeline, a complex instruction set computer (CISC), digital signal processor (DSP), and so forth. In some examples, CPU 670 may include a window manager 118 (not shown in FIG. 6) having logic and/or features configured or arranged for adjusting a window including portions of a queue structure maintained in a cache for a processing element (e.g., also maintained at CPU 670).

In some examples, chipset 680 may provide intercommunication among operating system(s) 610, network user device(s) 630, user I/O device(s) 640, storage 650, memory 660, CPU 670 or comms 690. For example, chipset 680 may provide intercommunication between operating system(s) 610, network I/O devices 630, user I/O device(s) 640, storage 650 and CPU 670 to retrieve information from storage 650 to display graphics on a display included in user I/O device(s) 640. The graphics may have been rendered by CPU 670 at the request of an operating system included in operating system(s) 610.

In some examples, comms 690 may include logic and/or features to enable system 600 to communicate externally with elements remote to system 600. These logic and/or features may include communicating over wired, wireless or optical communication channels or connections via one or more wired, wireless or optical networks. In communicating across such networks, comms 690 may operate in accordance with one or more applicable communication or networking standards in any version. Also, in some examples, comms 690 may be integrated with network I/O device(s) 630 in order to receive/forward data associated with communications to elements remote to system 600.

As mentioned above, interface 654, may allow hardware and/or firmware elements of system 600 to communicatively couple together. According to some examples, interface 654 may operate in accordance with one or more protocols or standards. These protocols or standards may be described in one or one or more industry standards (including progenies and variants) such as those associated with the $I^2C$ specification, the SMBus specification, the PCI Express specification, the USB specification, the SATA specification, the Accelerated Graphics Port (AGP) specification, the High-Definition Multimedia Interface (HDMI) standard, the Digital Visual Interface (DVI) specification, or the Bluetooth™ specification. Although this disclosure is not limited to only the above-mentioned standards and associated protocols.

In some examples, system 600 may be included in a computing device. Examples of a computing device may include, but is not limited to, a server, a blade server, a computing board, a desktop computer, a personal computer (PC) or a laptop computer.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture. An article of manufacture may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

According to some examples, an article of manufacture may include a non-transitory storage medium to store or maintain instructions that when executed by a computer or system, cause the computer or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a computer to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    establishing a first window for a queue structure of a given size maintained at least in part in a cache located at a multi-core processor, the cache for use by a core for the multi-core processor, the core configured to operate in cooperation with a network interface card for a network device, the first window to include portions of the queue structure having identifiers for active allocated buffers maintained in memory for the network device, the active allocated buffers configured to at least temporarily maintain data received or to be forwarded by the network interface card, the core configured to execute instructions to handle data received by the network interface card, the core to function as a consumer for the data received and the network interface card to function as a producer for the data received, the network interface card configured to cause the identifiers to be written to the portions of the queue structure maintained at least in part in the cache for use by the core without the identifiers being subject to eviction; and
    adjusting the first window based on information gathered while the identifiers are read from or written to the portions of the queue structure, the information gathered while the identifiers are read from and written to the queue structure to include information that indicates the core requires additional allocated buffers based on the core reading the identifiers in order to consume data stored in allocated buffers at a rate faster than the network interface card can write the identifiers to the portions of the queue structure included in the first window, the gathered information to indicate that additional active allocated buffers are needed to maintain a line rate throughput for forwarding data via a network communication channel capable of being coupled to the network interface card, the adjusted first window to result in a second window, the second window to include more portions of the queue structure having identifiers for active allocated buffers than were included in the first window.

2. The method of claim 1, comprising:
    adjusting the second window based on an indication that a reduced number of active allocated buffers are needed based on the core reading the identifiers in order to consume data stored in allocated buffers at a rate slower than the network interface card can write the identifiers to the portions of the queue structure included in the first window, the adjusted second window to result in a third window, the third window to include fewer portions of the queue structure having less identifiers for active allocated buffers than the portions of the queue structure included in the second window.

3. The method of claim 1, comprising establishing the first window for the queue structure of the given size by selecting the portions of the queue structure to be included in the first window based on the portions of the queue structure including cache warmed identifiers for active allocated buffers compared to unselected portions.

4. The method of claim 3, comprising the queue structure to be configured based on writing given identifiers to portions of the queue structure and then reading the given identifiers according to a last-in-first-out (LIFO) scheme.

5. The method of claim 1, comprising adjusting the second window based on an indication that some portions included in the second window no longer have identifiers for the active allocated buffers, the adjusted second window to result in a third window, the third window to include the same number of portions of the queue structure as the second window, the portions of the queue structure included in the third window having the identifiers for the active allocated buffers.

6. The method of claim 1, comprising the queue structure of the given size to be configured such that a limited number of separate identifiers can be included in a given window, the separate identifiers included in the given window to be separately associated with a single portion of the queue structure, each portion of the queue structure to be separately associated with a single unit of size, the cumulative total of portions of the queue structure included in the given window to add up to a total size that is equal to or less than the given size.

7. The method of claim 1, comprising the given size for the queue structure to be determined during initialization of the network interface card for the network device.

8. The method of claim 1, comprising the information gathered while the identifiers are read from and written to the queue structure includes quality of service information associated with data received or to be forwarded by the network interface card, the quality of service information to indicate whether a given throughput for forwarding or receiving data via the network communication channel is being maintained.

9. An apparatus comprising:
a processor circuit; and
a memory unit communicatively coupled to the processor circuit, the memory unit arranged to store instructions for logic operative on the processor circuit, the logic configured to:
establish a first window for a queue structure of a given size maintained at least in part in a cache located at a multi-core processor, the cache for use by a virtual machine implemented on a core for the multi-core processor, the virtual machine configured to operate in cooperation with a network interface card for a network device, the first window to include portions of the queue structure having identifiers for active allocated buffers maintained in memory for the network device, the active allocated buffers configured to at least temporarily maintain data received or to be forwarded by the network interface card, the virtual machine configured to execute instructions to handle data received by the network interface card, the virtual machine to function as a consumer for the data received and the network interface card to function as a producer for the data received, the network interface card configured to cause the identifiers to be written to the portions of the queue structure maintained at least in part in the cache for use by the virtual machine without the identifiers being subject to eviction; and
adjust the first window based on information gathered while the identifiers are read from or written to the portions of the queue structure, the information gathered while the identifiers are read from and written to the queue structure to include information that indicates the virtual machine requires additional allocated buffers based on the virtual machine reading the identifiers in order to consume data stored in allocated buffers at a rate faster than the network interface card can write the identifiers to the portions of the queue structure included in the first window, the gathered information to indicate that additional active allocated buffers are needed to maintain a line rate throughput for forwarding data via a network communication channel capable of being coupled to the network interface card, the adjusted first window to result in a second window, the second window to include more portions of the queue structure having identifiers for active allocated buffers than were included in the first window.

10. The apparatus of claim 9, comprising the memory unit to include volatile memory.

11. An article of manufacture comprising a non-transitory storage medium containing instructions that when executed cause a system to:
establish a first window for a queue structure of a given size maintained at least in part in a cache located at a multi-core processor, the cache for use by a virtual machine implemented on a core for the multi-core processor, the virtual machine configured to operate in cooperation with a network interface card for a network device, the first window to include portions of the queue structure having identifiers for active allocated buffers maintained in memory for the network device, the active allocated buffers configured to at least temporarily maintain data received or to be forwarded by the network interface card, the virtual machine configured to execute instructions to handle data to be forwarded by the network interface card, the virtual machine to function as a producer for the data to be forwarded and the network interface card to function as a consumer for the data to be forwarded, the virtual machine to write the identifiers to the portions of the queue structure maintained at least in part in the cache for use by the virtual machine, the identifiers to remain in the portions of the queue structure and not subject to eviction upon reading of the identifiers by the network interface card; and
adjust the window based on information gathered while the identifiers are read from or written to the portions of the queue structure, the information gathered while the identifiers are read from and written to the queue structure to include information that indicates the network interface card requires additional allocated buffers based on the network interface card reading the identifiers at a rate faster than the virtual machine can write the identifiers in the portions of the queue structure included in the first window, the gathered information to indicate to the logic that additional active allocated buffers are needed to maintain a line rate throughput to forward data via a network communication channel capable of being coupled to the network interface card, the adjusted first window to result in a second window, the second window to include more portions of the queue structure having identifiers for active allocated buffers than were included in the first window.

12. The article of manufacture of claim 11, comprising the instruction to further cause the system to establish the first window for the queue structure of the given size by selecting the portions of the queue structure to be included in the first window based on the portions of the queue structure including cache warmed identifiers for active allocated buffers compared to unselected portions.

13. The article of manufacture of claim 12, comprising the queue structure to be configured based on writing given identifiers to portions of the queue structure and then reading the given identifiers according to a last-in-first-out (LIFO) scheme.

14. The article of manufacture of claim 11, comprising the instructions to further cause the system to:
adjust the second window based on an indication that a reduced number of active allocated buffers are needed based on the network interface card reading the identifiers in order to consume data stored in allocated buffers at a rate slower than the virtual machine can write the identifiers to the portions of the queue structure included in the first window, the adjusted second window to result in a third window, the third window to include fewer portions of the queue structure having less identifiers for active allocated buffers than the portions of the queue structure included in the second window.

15. The article of manufacture of claim 11, comprising the information gathered while the identifiers are read from and written to the queue structure includes quality of service information associated with data to be received or forwarded by the network interface card, the quality of service information to indicate whether a given throughput for forwarding or receiving data via the network communication channel is being maintained.

16. The apparatus of claim 9, comprising the logic to establish the first window for the queue structure of the given size by selecting the portions of the queue structure to be included in the first window based on the portions of the queue structure including cache warmed identifiers for active allocated buffers compared to unselected portions.

17. The apparatus of claim 16, comprising the queue structure to be configured based on writing given identifiers to portions of the queue structure and then reading the given identifiers according to a last-in-first-out (LIFO) scheme.

18. The apparatus of claim 9, comprising:
adjusting the second window based on an indication that a reduced number of active allocated buffers are needed based on the virtual machine reading the identifiers in order to consume data stored in allocated buffers at a rate slower than the network interface card can write the identifiers to the portions of the queue structure included in the first window, the adjusted second window to result in a third window, the third window to include fewer portions of the queue structure having less identifiers for active allocated buffers than the portions of the queue structure included in the second window.

19. The apparatus of claim 9, comprising the information gathered while the identifiers are read from and written to the queue structure includes quality of service information associated with data to be received or forwarded by the network interface card, the quality of service information to indicate whether a given throughput for forwarding or receiving data via the network communication channel is being maintained.

* * * * *